Patented July 3, 1945

2,379,703

UNITED STATES PATENT OFFICE 2,379,703

PROCESS FOR THE PRODUCTION OF DERIVATIVES OF POLYHYDROXY ALCOHOLS

Daniel Geltner, Astoria, N. Y., assignor to The Richards Chemical Works, Inc., Jersey City, N. J., a corporation of New Jersey No Drawing. Application April 24, 1942, Serial No. 440,398

6 Claims. (Cl. 260—615)

This invention relates to a process for the production of certain glycol derivatives which are useful as wetting, penetrating, emulsifying and foaming agents, as detergents, as textile assistants, etc. The invention includes this new process and certain new products which are advantageously produced by it. The new products of the invention are a subclass included within the general class of products described and claimed in my application Serial No. 440,397, filed April 24, 1942, which are advantageously produced by the process of this invention. The process, however, is not limited to the production of these products.

The products produced in accordance with this invention are glycol derivatives which may be represented by the formulae:

(1)    $ROCH_2OZOH$ and (2)    $ROCH_2OZOCH_2OR$ in which R represents the residue of a compound having a long carbon-linked chain or other hydrophobe radical having 6 to 20 or more carbon atoms and corresponding to the carbon-linked chain of a fatty acid or the hydrophobe radical of a resin, naphthenic or alicyclic acid and Z represents the residue of a polyhydroxy alcohol, usually a polyoxyethylene glycol which contains a number of ethylene groups. These compounds may be regarded as glycol derivatives of formals of higher alcohols.

In accordance with the process of the invention, a chlormethyl ether is reacted with a polyhydroxylated body, usually a polyoxyethylene glycol, although glycerine, ethylene glycol, propylene glycol or other polyhydroxy alcohol may be used. The products are ordinarily produced by reacting the two materials at room temperature in equi-molar proportions. If the chlormethyl compound and the polyhydroxy alcohol are used in equi-molar proportions, the resulting products will be the unsymmetrical products represented by Formula 1 above. If the chlormethyl compound and the polyhydroxy alcohol are used in the molar proportions of 2 to 1, the product will be the symmetrical product represented by Formula 2. While the reaction is ordinarily carried out at room temperatures, higher temperatures may be used, but the results are apt to be poor if the material is heated for any prolonged period at a temperature as high as 100° C. or higher. Hydrogen chloride may be removed from the reaction product by passing in a stream of dry nitrogen.

The final product produced will ordinarily contain the desired product in admixture with products of side reactions, unreacted starting material, etc., but for most purposes are suitable for use without any further purification.

The products so produced are stable to acids and alkalis and are not precipitated by heavy metals or hard water, and therefore have a wide range of usefulness. Their solubility in water, as produced, will depend upon the nature of the radical containing the hydrophobe group and upon the nature of the glycol or other polyhydroxy alcohol used. Products produced from glycerine or ethylene or diethylene glycol or other low molecular weight polyhydroxy alcohol will ordinarily be but partially, if at all, soluble or dispersible in water, particularly if the radical containing the hydrophobe group is one which is not easily solubilized, such as the radical derived from chlormethyl stearyl ether. To increase the solubility or dispersibility of the compounds in water, they may be sulfonated with the usual sulfonating agents such as concentrated sulfuric acid, oleum or chlorsulfonic acid. This treatment of the compounds not only tends to increase their solubility or dispersibility in water, but also converts them from a non-ionic form to an anionic form.

The chlormethyl ethers which are used in the new process are conveniently prepared by treating a higher alcohol with formaldehyde or one of its polymers, usually paraformaldehyde, and hydrochloric acid in the cold. These chlormethyl compounds are not stable in water, and should be handled accordingly.

Among the chlormethyl ethers which may be reacted with polyhydroxy alcohols in accordance with the process of the invention are those of lauryl, cetyl, stearyl, and oleyl alcohols, the alcohols obtained by the hydrogenation of naphthenic acids or phenols, and other higher alcohols having 6 to 20 carbon atoms and the chlormethyl ethers of ethers or esters of polyhydroxy compounds having at least one hydrocarbon group having 6 to 20 carbon atoms, such as the higher fatty acid mono- or diglycerides, including glycerine monolaurate, glycerine di-oleate and glycerine monostearate, similar derivatives of ethylene or diethylene glycol, ester anhydrides of the sugar alcohols such as mannitan monostearate and sorbitan monolaurate, or other esters of carboxy acids with polyhydroxy alcohols having at least one residual hydroxyl group and corresponding ethers obtained from the polyhydroxy alcohols or their anhydrides and higher alcohols.

Of course, it is not necessary to use pure materials as the reactants and, indeed, mixtures of starting materials, such as mixtures of a higher alcohol with a higher acyl amide or acyl-amido-alcohol, may be converted to the chlormethyl derivative by treatment with paraformaldehyde and hydrochloric acid and used to prepare mixed final products which, with or without sulfonation, may be used for the purposes outlined above.

The invention will be illustrated by the following examples, but it is not limited thereto.

*Ex. 1.*—7.1 parts of a 35% solution of lauryl chlormethyl ether in benzene were mixed with 15.4 parts of Carbowax 1540 (a polyoxyethylene glycol having an estimated molecular weight of 1540). The mixture was heated on a steam bath until solution took place. The resulting product was completely soluble in water, had good foaming and wetting properties and was stable to both acids and alkalis. After treatment with sufficient caustic soda to neutralize the free hydrochloric acid, a product was obtained which remained stable for a considerable period of time.

*Ex. 2.*—7.1 parts of a 35% solution of lauryl chlormethyl ether in benzene were mixed with 1.9 parts of diethyl glycol and heated to 60° C. The reaction was slow at first but after a few minutes complete solution took place, with evolution of hydrogen chloride. The product obtained was sulfonated at 10° C. with an equal weight of chlorsulfonic acid, giving a water-soluble product having good wetting properties.

*Ex. 3.*—7.1 parts of a 35% solution of lauryl chlormethyl ether in benzene were mixed with 4.4 parts of nonaethylene glycol and heated to 50 to 60° C. for a few minutes. The resulting product was completely water soluble and had excellent foaming and penetrating properties.

*Ex. 4.*—2.2 parts of diethylene glycol were mixed with 9.4 parts of a 62% solution of cetyl chlormethyl ether in benzene and heated for over an hour at 70 to 80° C. A stream of nitrogen was then passed through until no more hydrogen chloride was driven off. The benzene was evaporated off, leaving a colorless, odorless solid at room temperature, which was dispersible in water and foamed well. This product was sulfonated by treating it with chlorsulfonic acid in ether, giving a sulfonated product which was completely soluble in acid solutions. Neutralization with caustic soda to a pH of 7 gave a product which in aqueous solution foamed well and had excellent penetrating and detergent properties.

The new products of the invention may be treated with a sulfonating or sulfating agent such as concentrated sulfuric acid, oleum or chlorsulfonic acid to produce products having increased hydrophilic properties which are more readily dispersible or soluble in water. In general, where sulfonation is not used, the dispersibility or solubility of the new compositions in water will vary inversely with the size of the hydrocarbon group and directly with the size of the polyoxyethylene radical.

I claim:

1. A new composition of matter having the formula $$R-O-CH_2-(OC_2H_4)_n-O-Y$$

in which R is a carbon-linked chain having from 6 to 20 carbon atoms, $n$ is greater than 1 and Y is a radical selected from the group consisting of hydrogen and $ROCH_2-$.

2. A new composition of matter having the formula set forth in claim 1 in which R—O is an alcohol having a hydrophobe group.

3. A new composition of matter having the formula set forth in claim 1 in which R—O is a fatty alcohol radical.

4. A new composition of matter having the formula set forth in claim 1 in which R—O is an ester of a carboxylic acid with a polyhydroxy alcohol.

5. The process of preparing compositions useful as wetting, dispersing, foaming, emulsifying and cleansing agents which comprises reacting a polyhydroxy alcohol with an ether of the type $ClCH_2OR$ in which R is the carbon linked radical of an alcohol having at least 6 carbon atoms.

6. The process of preparing compositions useful as wetting, dispersing, foaming, emulsifying and cleansing agents which comprises reacting a polyhydroxy alcohol with an ether of the type $ClCH_2OR$ in which R is the carbon-linked radical of a fatty alcohol.

DANIEL GELTNER.